T. A. WILLIAMS.
GLAZING STRIP FOR WINDOW FRAMES.
APPLICATION FILED AUG. 18, 1908.
915,142.
Patented Mar. 16, 1909.
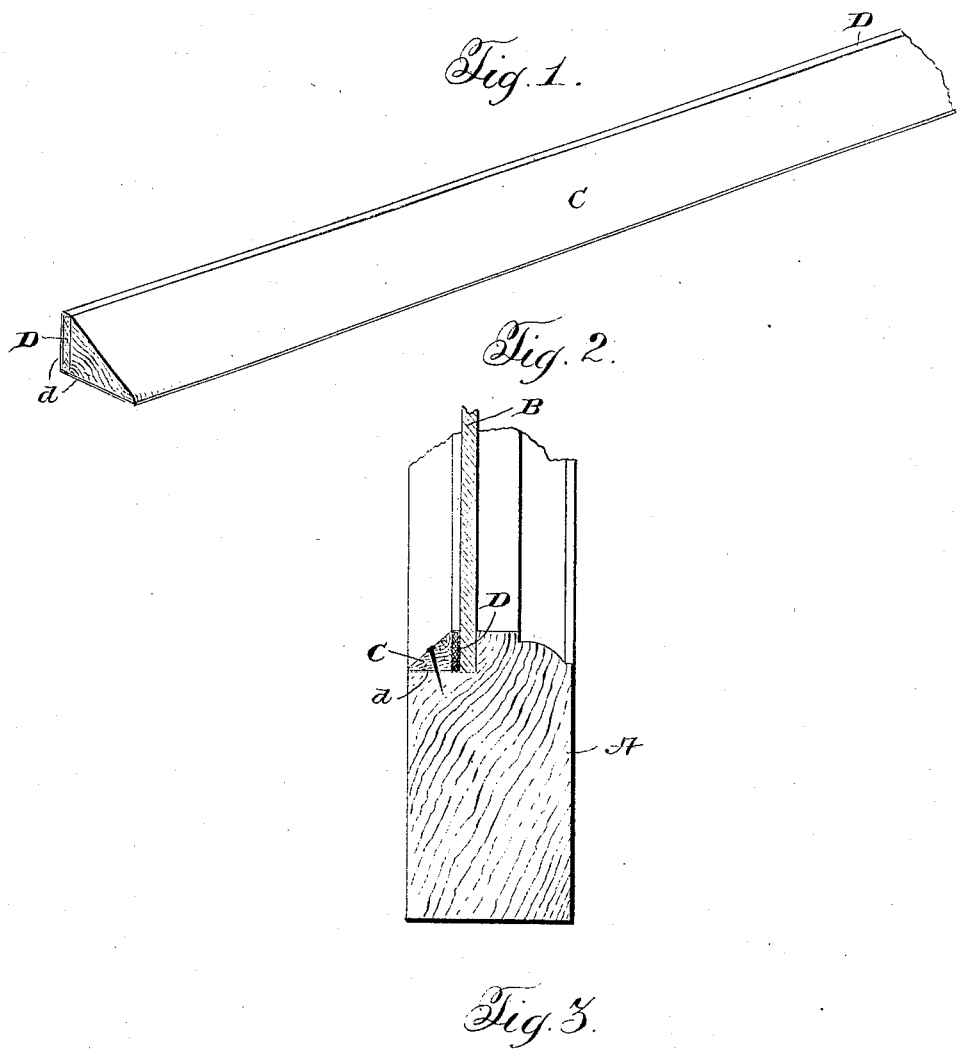

UNITED STATES PATENT OFFICE.

THOMAS A. WILLIAMS, OF FALLS CHURCH, VIRGINIA.

GLAZING-STRIP FOR WINDOW-FRAMES.

No. 915,142.　　　　Specification of Letters Patent.　　Patented March 16, 1909.

Application filed August 18, 1908. Serial No. 449,140.

*To all whom it may concern:*

Be it known that I, THOMAS A. WILLIAMS, a citizen of the United States, residing at Falls Church, in the county of Fairfax and State of Virginia, have invented certain new and useful Improvements in Glazing-Strips for Window-Frames, of which the following is a specification, reference being had therein to the accompanying drawing.
This invention relates to an improvement in glazing strips for window frames and it is embodied in the construction and arrangement of parts presently to be described and defined in the claim.
While the invention is primarily intended for use in connection with window frames, it is to be understood that it can be employed in connection with glazing or securing glass in other frames—such as door frames or frames which are exposed to the weather.

The object of the invention is to provide for securing panes of glass in exposed frames in a manner that will render the joint perfectly tight, preventing thereby the movement of the pane of glass in the frame and which will exclude all moisture from the joints.

A further object of the invention is to provide a strip which will effectively take the place of the well known putty, which is now so largely used in connection with the securing of panes of glass in frames.

Primarily the invention consists of a strip of wood, preferably having its face opposite the glass wholly covered with a material which will form not only a cushion but a seal so that the glass will be held firmly in place and the joint sealed against the entrance of moisture.
In the drawing, Figure 1 is a perspective view of a length of strip embodying the invention, Fig. 2 is a section through a window frame showing the glass in place and a strip applied, and Fig. 3 is a cross section through one of the strips.

A designates the window frame having the usual glass receiving rabbet at one edge, B designates the glass, and C designates the improved glazing strip. The glazing strip C is formed conveniently of a strip of wood of triangular shape, as shown, or of any other suitable shape. The vertical face of the strip C is formed perfectly plain or flat and has permanently secured thereto a strip D, conveniently of felt or other absorbent material. This strip D is cemented directly to the vertical face of the part C and covers the entire surface of that face of the strip, as clearly shown in the drawing. Extending from the lower edge of the strip C to the top, as the facing strip D does, a complete unbroken surface is provided which when in use is brought close against the side of the edge portion of the glass, as shown in Fig. 2. When in this position, the strip C is tacked or nailed into position and thereby the glass is held firmly in place. To form a complete seal between the strip and the glass, I coat the facing D with an adherent and nonabsorbent material, such as a coating of white lead, indicated at *d*. This material is absorbed by the absorbent facing strip and renders the same in that particular impervious and free from the deteriorating action of the weather or moisture. It also serves to complete the seal between the strip and the glass. In practice, the bottom of the strip C, as shown in Fig. 3, is also coated with the lead preparation or adherent so that when the strip is applied, the joint between the same and the frame and glass is completely sealed.

The strip made in accordance with this invention can be manufactured very cheaply in lengths and cut to fit the necessary opening to be closed, can be quickly applied, will receive a decorative or preserving coating of paint, and can be easily removed without defacing the sash, in case of the replacement of a pane of glass. By having the entire vertical face of the strip faced with the yielding sealing material, the strip is rendered useful in connection with any irregular panes of glass, in that the material can be compressed more or less so as to accommodate the strip to the irregular surfaces with which it contacts.

Modified forms can be made as to the shape of the exposed or outer face of the strip, so long as the facing strip covers the entire glass abutting surface of the strip. When I use the term "wood", I desire it understood that any fibrous material may be employed which would be the equivalent thereof.

An important advantage of the strip being made of wood and having its entire contacting surface covered by the yielding facing is that in applying the strip the glass is not liable to be broken and yet the strip can be forced tight up toward the glass primarily or by tacking.

An additional advantage of employing wooden strips is that the strips can be easily made in any length and by a carpenter readily sawed or cut to proper lengths to fit. By the use of wood also, the joint is not affected by variations of temperature, the expansion or contraction of the strip being the same as that of the sash to which it is applied. Brads or tacks can be readily driven through the wood while it is held in its proper position relative to the glass without danger of breaking or cracking the glass.

Other advantages will be readily appreciated by those skilled in the art.

Having thus described the invention, what I claim as new and desire to secure by Letters Patent is:

Means for securing glass in frames consisting of a wood strip having an angular portion, one face of which is formed to fit the glass and the other the frame, the glass fitting face being covered with a lining of soft absorbent material having incorporated therein and coated on its outer face with a non absorbent preserving material.

In testimony whereof I affix my signature in presence of two witnesses.

THOMAS A. WILLIAMS

Witnesses:
A. E. HUTCHINSON,
L. S. BACON.